(12) United States Patent
Zhang et al.

(10) Patent No.: US 10,397,287 B2
(45) Date of Patent: Aug. 27, 2019

(54) AUDIO DATA TRANSMISSION USING FREQUENCY HOPPING

(71) Applicant: Microsoft Technology Licensing, LLC, Redmond, WA (US)

(72) Inventors: Zhengyou Zhang, Bellevue, WA (US); Dinei Afonso Ferreira Florencio, Redmond, WA (US); Sasa Junuzovic, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/446,827

(22) Filed: Mar. 1, 2017

(65) Prior Publication Data
US 2018/0255111 A1 Sep. 6, 2018

(51) Int. Cl.
| | |
|---|---|
| *H04B 1/713* | (2011.01) |
| *H04B 11/00* | (2006.01) |
| *H04L 27/26* | (2006.01) |
| *H04L 29/06* | (2006.01) |

(52) U.S. Cl.
CPC ........... *H04L 65/403* (2013.01); *H04B 1/713* (2013.01); *H04B 11/00* (2013.01); *H04L 27/2601* (2013.01); *H04Q 2213/13095* (2013.01)

(58) Field of Classification Search
CPC ... H04L 65/403; H04L 27/2601; H04B 1/713; H04Q 2213/13095
See application file for complete search history.

(56) References Cited

U.S. PATENT DOCUMENTS

| | | | | |
|---|---|---|---|---|
| 3,596,181 A | * | 7/1971 | Dowling | H04B 10/112 178/17 C |
| 4,429,387 A | * | 1/1984 | Kaminski | H04L 12/02 370/522 |
| 4,453,041 A | * | 6/1984 | Castro | H04M 1/665 379/142.05 |
| 5,070,504 A | * | 12/1991 | Bossen | G06K 19/14 235/494 |
| 5,821,519 A | * | 10/1998 | Lee | G06K 7/14 235/462.27 |
| 6,256,072 B1 | * | 7/2001 | Bae | H04N 5/44504 348/461 |

(Continued)

FOREIGN PATENT DOCUMENTS

| | | |
|---|---|---|
| DE | 2505442 A1 | 8/1976 |
| WO | 2010138777 A1 | 12/2010 |

(Continued)

OTHER PUBLICATIONS

Ahmed, et al., "Frequency Hopped-Orthogonal Frequency Division Multiple Access (Fh-Ofdma) System Performance with Extending Quadratic Congruence (Eqc) Hoping Code Patterns", In Journal of Engineering and Development, vol. 12, No. 1, Mar. 2008, pp. 96-106.

(Continued)

*Primary Examiner* — Qun Shen
(74) *Attorney, Agent, or Firm* — Schwegman Lundberg & Woessner, P.A.

(57) ABSTRACT

A method includes obtaining data representing multiple characters, determining a code for each character wherein each code corresponds to a different audio frequency, and transmitting the codes at the corresponding audio frequencies.

22 Claims, 6 Drawing Sheets

(56) References Cited

U.S. PATENT DOCUMENTS

| | | |
|---|---|---|
| 8,823,494 B1 | 9/2014 | Kovitz et al. |
| 9,424,858 B1 | 8/2016 | Pistacchio et al. |
| 2003/0076248 A1* | 4/2003 | Larson .............. H03M 7/06 341/104 |
| 2004/0001553 A1* | 1/2004 | Steentra .............. H04L 27/2602 375/260 |
| 2004/0044904 A1* | 3/2004 | Yamazaki .......... H04L 12/1822 726/29 |
| 2008/0030383 A1* | 2/2008 | Cameron .............. G06F 17/277 341/55 |
| 2008/0161660 A1* | 7/2008 | Arneson ............ A61B 1/00016 600/302 |
| 2008/0280653 A1 | 11/2008 | Ma et al. |
| 2011/0028091 A1 | 2/2011 | Higgins et al. |
| 2012/0220240 A1 | 8/2012 | Rothschild et al. |
| 2013/0029596 A1 | 1/2013 | Preston et al. |
| 2015/0026580 A1 | 1/2015 | Kang et al. |
| 2015/0099466 A1 | 4/2015 | Narendra et al. |
| 2015/0229782 A1 | 8/2015 | Zuidema et al. |
| 2016/0055862 A1 | 2/2016 | Wolff et al. |
| 2016/0234221 A1 | 8/2016 | Junuzovic et al. |
| 2017/0142477 A1* | 5/2017 | Liu .................. H04N 21/4398 |

FOREIGN PATENT DOCUMENTS

| | | |
|---|---|---|
| WO | 2015195808 A1 | 12/2015 |
| WO | 2016114988 A2 | 7/2016 |

OTHER PUBLICATIONS

Li, et al., "A Spectrally Efficient Frequency Hopping System", In Proceedings of Global Telecommunications Conference, Nov. 26, 2007, pp. 2997-3001.

Shi, et al., "All Digital Baseband Frequency Hopping OFDM System", In Proceedings of 11th IEEE Singapore International Conference on Communication Systems, Nov. 19, 2008, pp. 661-665.

Scholand, et al., "Physical Layer Performance of a Novel Fast Frequency Hopping-OFDM Concept", In Proceedings of the IST Mobile Summit, Jun. 19, 2005, 5 pages.

Al-Dweik, et al., "On the Analysis of Frequency-Hopped Multiple-Access Communication with Noncoherent Ofdm-Ask in Awgn Channels", http://web.archive.org/web/20060709160419/http:/www.cs.jhu.edu/~moheeb/webpage_files/OFDM-AWGN-04.pdf, Published on: Jul. 9, 2006, 5 pages.

Miatsuoka, et al., "Acoustic OFDM system and its extension", In Journal of Visual Computer, vol. 25, Issue 1, Jan. 2009.

Nandakumar, et al., "Dhwani: secure peer-to-peer acoustic NEC", In Proceedings of the ACM SIGCOMM conference on SIGCOMM, Aug. 12, 2013, pp. 63-74.

"International Search Report and Written Opinion Issued in PCT Application No. PCT/US2018/019302", dated May 8, 2018, 12 Pages.

\* cited by examiner

2

AUDIO DATA TRANSMISSION USING FREQUENCY HOPPING

BACKGROUND

When attending a telecommunication conference in a conference room, various systems have been used to create a connection between a client and a meeting room to allow sharing of data between attending clients. For that purpose, the client will identify which room it should connect to. Past technology has asked the user to type in a conference identifier such as a PIN or code (e.g., internet protocol (IP) address) that identifies the room. User entry of such codes is error prone and inconvenient.

SUMMARY

A method includes obtaining data representing multiple characters, determining a code for each character wherein each code corresponds to a different audio frequency, and transmitting the codes at the corresponding audio frequencies.

A machine readable storage device has instructions for execution by a processor of the machine to cause the processor to perform operations. The operations include obtaining data having multiple characters, determining a code for each character wherein each code corresponds to a different audio frequency, and transmitting the codes at the corresponding audio frequencies.

A device includes a processor and a memory device coupled to the processor and having a program stored thereon for execution by the processor to perform operations. The operations include obtaining data having multiple characters, determining a code for each character wherein each code corresponds to a different audio frequency, and transmitting the codes at the corresponding frequencies.

DETAILED DESCRIPTION

Figure 1:
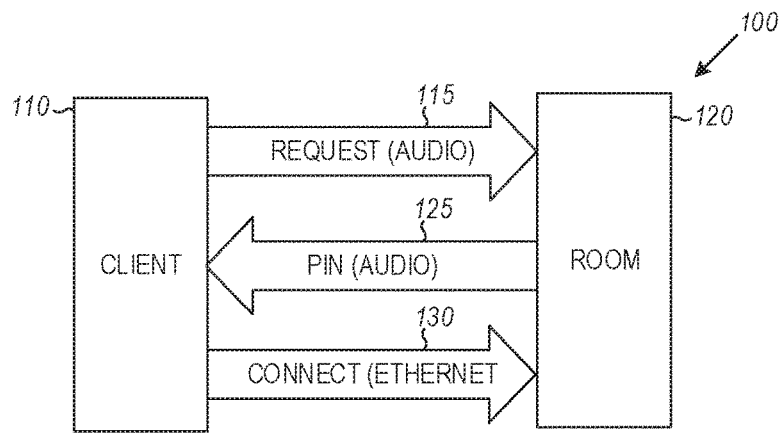
FIG. 1 is a block flow diagram illustrating communication of information via audio signals between a room and a device according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system." and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

When attending a conference in a conference room, a connection between a client and the conference or meeting room computer is provided to allow sharing of data between attending clients. Rather than asking a user to enter (e.g., type in) a sequence of alphanumeric characters for a conference identification code, such as a PIN or numeric code (e.g., internet protocol (IP) address) that identifies the room or a particular conference session. The conference identification code is transmitted by the room using high-frequency audio and used by the client to establish a connection with the conference room computer.

Figure 2:
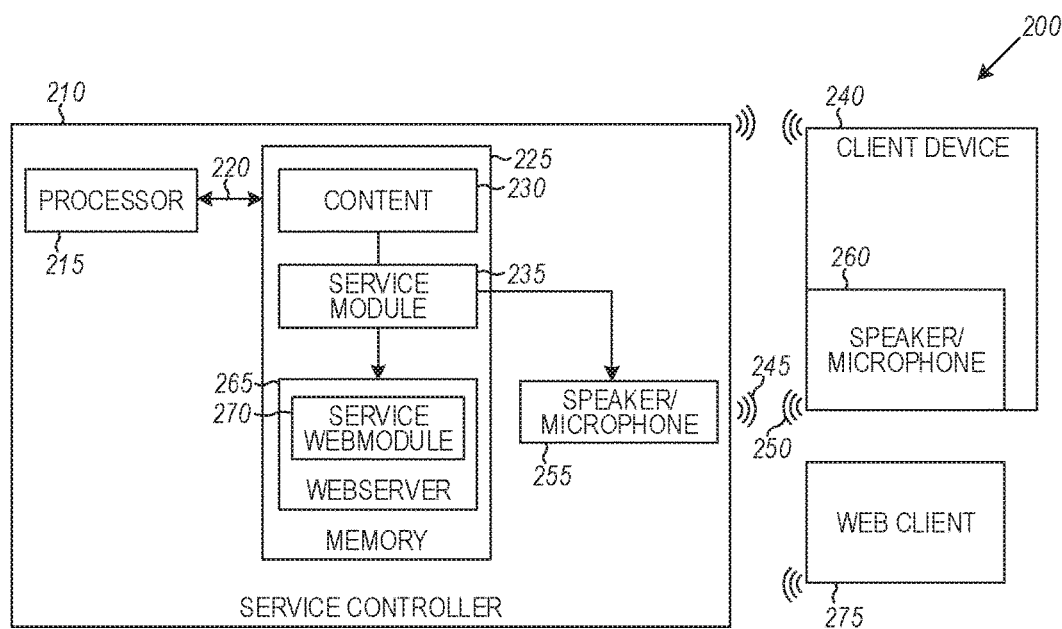
FIG. 2 is a block diagram of an example system of a service controller device in a room communicating with a client device and a web client according to an example embodiment.

FIG. 1 illustrates in block diagram form, an example 100 of a client device 110 requesting a conference identification code (e.g., a PIN) at 115. The request may be in the form of an audio signal in various embodiments. A device (e.g., as illustrated in FIG. 2) in a room 120 responds with the conference identification code at 125 by an audio broadcast at multiple frequencies. The conference identification code 125 may be received by a microphone in the client and used by the client device 110 to connect to other clients in a room to share data via a wireless connection 130 such as an Ethernet connection.

In some embodiments, clients may be attending remotely and may already have a voice connection over which the conference identification code 125 may be received, allowing remote users to join in to share data. Data in various embodiments may be shared at a website for example, with the conference identification code providing a suitable website address such as uniform resource locator (URL) or internet protocol (IP) address of the website or a pointer to such an address.

In one embodiment, the request itself may convey information. For example, there may exist several pre-determined codes, one code for requesting a device corresponding to the room to respond in high frequency, another code representing the conference identification code in low frequency, or vice versa. There may be pre-determined codes to signal to the device that the device corresponding to the room needs to respond louder, or to request additional information (e.g., the full IP address). In one embodiment, an audio pilot signal may be transmitted prior to transmission of the codes to synchronize clocks between a transmitter of the codes and a receiver of the codes.

FIG. 2 is a block diagram of an example system 200 of a service controller device 210, which corresponds to the device associated with the room. The service controller device 210 may be placed in a conference room and used to provide a means of connecting multiple devices for sharing data during a conference or other type of event. The room may be a conference room, or other gathering area in a building, stadium, theatre, park, field, etc., where multiple users may interact and desire to share data. The device corresponding to the room may even be a mobile device of a meeting organizer in some embodiments, such that any area within audible range of the mobile device corresponds to the room.

A processor 215 may be included within the service controller device 210 and connected by a bus 220 to a memory 225. The processor 215 may be used to process instructions provided it to it from the memory 225. The bus 220 can be any of several types of bus structures, including a memory bus or memory controller, a peripheral bus or external bus, and a bus using any variety of available bus architectures known to those of ordinary skill in the art. The memory 225 may include volatile memory and nonvolatile memory.

In some examples, the memory 225 may store content 230 and a service module 235. The content 230 may be any data to be accessed on the service controller device 210. The service controller device 210 may be a meeting controller for multiple individuals with a number of devices. The content 230 may include slide-based presentations, static images, videos, interactive designs, text documents, online content, such as web pages and online videos, or any other type of audio, visual, or machine-interpreted data for display, projection, sharing, or play-by-reference. The content 230 may have been already stored on the service controller device 210 or may have been transferred to the service controller device 210 by a connected or previously connected client device 240. Client device 240 that is connected, such as by a wireless or wired connection, to service controller device 210 may have access to a service module 235. The service module 235 may provide the client device 240 the ability to transmit, alter, view, or copy the content 230 that may be stored on the memory 225 of the service controller device 210. The service controller device 210 also may regulate the connections of the client device 240 by implementing a method of connection with the techniques and embodiments shown in FIG. 1 via audio signals indicated at 245 and 250. Signals 245 and 250 may be sent and received via respective speakers and microphones indicated at 255 and 260 in the service controller device 210 and client device 240. Although one client device 240 is shown as connecting to the service module 235, in some embodiments, many other client devices may also connect to the service module 235 and thereby also gain access to the content 230 stored on the memory 225 of the service controller device 210. Further, the service module 235 may control the display of any content 230 stored on the memory 225 of the service controller device 210 by transmitting certain content 230 to another communicating device such as a television or computer monitor.

The memory 225 of the service controller device 210 may further store a web server 265 which may include a service web module 270 for interfacing with web clients 275. The web server 265 may enable the connection of web clients 275 to the service controller device 210. In some examples, the web clients 275 are not connected directly to the service controller device 210, but instead connected through an intermediate network such as the internet, including the protocols covered by the conventions of the World Wide Web. The web server 265 may include service web module 270 that may manage the connections of each connecting web client 275 and may also interface with the service module 235 to allow communication between a web client 274, client device 240, and service controller device 210. When a web client 275 is connected to the web server 265, the service web module 270 may be used to interact with the service module 235 to perform all of the actions discussed relating to the service module 235 above. The service module 235 and service web module 270 may correspond to structural elements that perform associated functions. In some embodiments, the functionalities of the service module 235 and service web module 270 can be implemented with logic, wherein the logic, as referred to herein, can include any suitable hardware (e.g., a processor, among others), software (e.g., an application, among others), firmware, or any combination of hardware, software, and firmware.

In some embodiments, the device associated with the room itself may continuously (or periodically) broadcast the code as illustrated generally at 300 in a block flow diagram illustrating interactions between room 120 and client device 110. In this case, it is expected that most clients would be able to decode the signal indicated at 310 and 315 and proceed directly to connect at 130. However, clients 110 that are not able to decode the continuous signal would still send a request 115 to the room 120, which would then broadcast the conference identification code in a different way at 125. For example, the continuous broadcast 310, 315 may be at a very high audio frequency (e.g., 21 KHz and above). Clients 110 that are not able to decode such high audio frequencies may then send a request 115 for the room 120 to broadcast the conference identification code using a lower audio frequency (e.g., 18 KHz) at 125.

In various embodiments, a new modulation technique may be used to communicate using audio signals. Room reverberation can be a significant problem when using audio to communicate between two devices. Each room may have different reverberation characteristics which may interfere with standard audio communications techniques. Sounds cards used in common devices, such as personal computers, smart phones, tablets, and the like may typically have a maximum output amplitude (as opposed to a maximum power output, as common in RF systems).

In one embodiment, orthogonal frequency division multiplexing (OFDM) and frequency hopping is performed in an audio range of frequencies which may be above the frequencies normally detectable by humans. OFDM codes are designed with a combination of traditional OFDM code design, and may be combined with a windowing technique targeted at reducing the spectral leakage into audible bands.

In one embodiment, each code is assigned to a frequency and also to a particular digit, letter, or symbol of the conference identification code or other information to be communicated. In a simple form, each code may be a sinusoidal signal broadcast at a unique frequency. In one embodiment, 50 different codes, each at a difference frequency are used to broadcast characters of a 5 digit PIN. The frequencies of the set of codes in one embodiment may start at a frequency LowF. Each OFDM code, Ci, is designed as a code with length, CodeLen, centered at frequency, Fi. Adjacent frequencies, such as Fi and Fi+1, are spaced by "step" as in traditional OFDM. In one embodiment, the request for data comprises codes selected from a set of code different from the codes for the data.

A set of frequencies, Fi, for the codes, Ci, may be determined in the following manner:

step=1/CodeLenSec;

$Fi$=Low$F$+step*$i$;

$Ci$=sin($Fi/Fs$*pi*(1:(CodeLen))), where $Fs$ is the sampling frequency.

In traditional OFDM, however, the codes are concatenated. Instead, in one embodiment, the codes am smoothed and overlapped to facilitate frequency hopping. To that end, the codes may be made a little longer (e.g., LapSz longer), and may be smoothed to move the ends of the codes so that the transition between the codes is smoother by using a smoothing window SmWd, e.g., step=1/CodeLenSec;

$Fi$=Low$F$+step*$i$;

$Ci$=sin($Fi/Fs$*pi*(1:(CodeLen+Lap$Sz$)));

$Ci$([1:Lap$Sz$(end-Lap$Sz$+1):end])=$SmWd.$*$Ci$([1:Lap$Sz$ (end-Lap$Sz$+1):end])

Note that the smoothing window may be designed such that the orthogonality between the codes is not affected, and additionally, the amplitude on the overlap region (of any two added codes) does not exceed one. Note this constraint on the amplitude is in contrast to the usual constraint on power. In one embodiment, the amplitude constraint is accomplished by using a Hann Window:

HannSmooth=hanning(2*Lap$Sz$+1);

$SmWd$=HannSmooth([1:Lap$Sz$(Lap$Sz$+2):end]);

where hanning is a Hann function or other discrete window function used to select a subset of a series of samples in order to perform a Fourier transform or other calculation to convert a sampled signal to the frequency domain. Note that the SmWd smoothing function is constructed such that the sum of samples will add to one when the first half of the window is overlapped with the second half.

The use of traditional OFDM codes, combined with the design of a window that allows for the overlap without breaking the orthogonality between the codes and without exceeding amplitude 1 after superposition make the codes appropriate for use with amplitude-limited transmissions system, such as personal computer sound cards.

Figure 4:
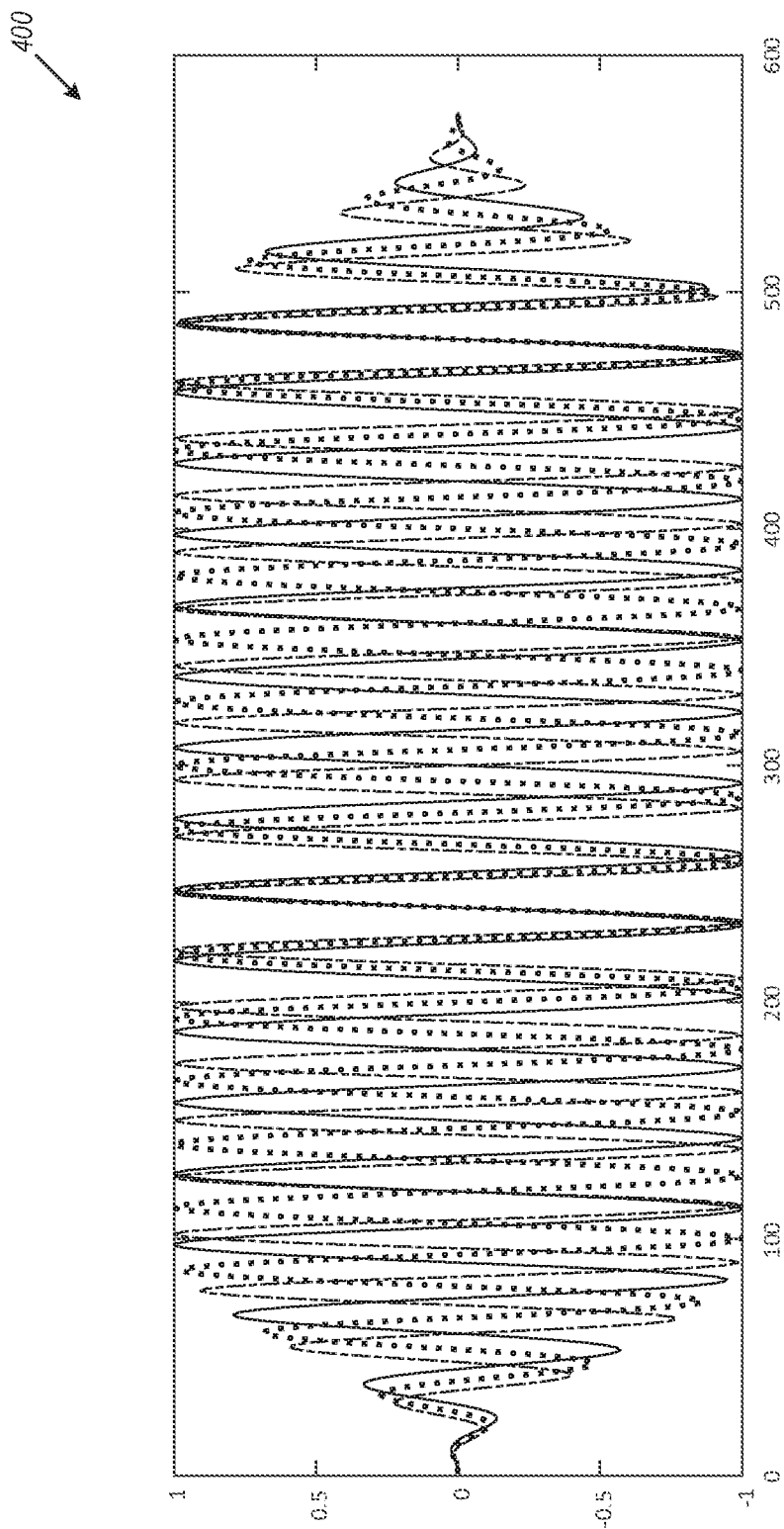
FIG. 4 is a diagram illustrating the codes in the time domain according to an example embodiment.

FIG. 4 is a graph 400 illustrating three example codes in the time domain with the y-axis indicating amplitude with "1" corresponding to a maximum speaker amplitude and the x-axis corresponding to time. Note that, for easier visualization, in this example the codes have 700 samples, and only a few cycles. In a typical embodiment, a code may have 40 ms duration, which at 48 kHz sampling means it will have 1920 samples. If the code uses a frequency of, say, 16 kHz the 40 ms code will have a total of 640 cycles, (which would be hard to visualize in a drawing).

Figure 5:
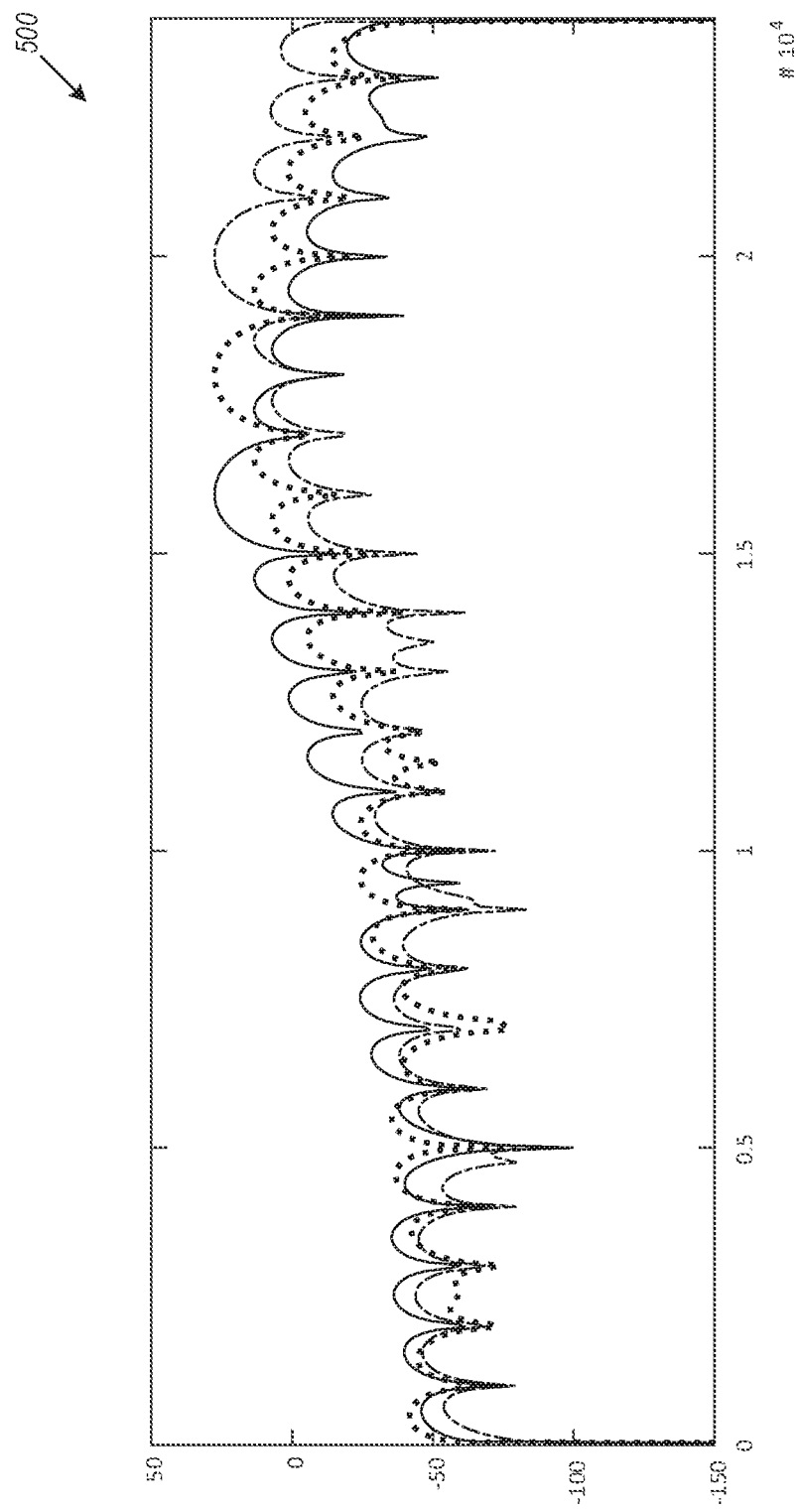
FIG. 5 is a diagram illustrating a corresponding fast Fourier transform (FFT) of the codes according to an example embodiment.

FIG. 5 illustrates a corresponding fast Fourier transform (FFT) 500 of the codes 400. Note that, due to the way the codes are constructed, the spectral peak of each of the three codes is aligned with notches on the other two codes. This will eliminate interference between the codes.

Another aspect of conference rooms that significantly differ from a typical RF application is the long reverberation time. For example, while a typical code length may be in the order of 40 milliseconds (i.e., CodeLenSec=0.04), conference rooms may have a reverberation time of several hundred milliseconds (e.g., T60=500 milliseconds or greater is common). Typical solutions such as introducing a guard time would significantly impair the transmission, because the guard times would have to be long.

Spread spectrum frequency hopping was developed as a military application, where a predetermined sequence of frequencies is used, and a small amount of information is transmitted in each frequency. The assumption in that application is that the enemy does not know the frequencies being used, and thus cannot piece together all information needed for a successful decode. In the present embodiments, frequency hopping is used for a different purpose, to alleviate the long reverberation time typical of audio in a conference room.

The long reverberation time may be ignored by not reusing any of the codes, or only reusing after a long time. For an example 5 digit PIN, instead of binarizing the code (and using two orthogonal codes) to transmit the bits, 50 distinct, orthogonal codes may be used. The first set of 10 codes are used to send the first digit of the PIN, a second set of 10 codes is used to send the second digit, and so on. The list of codes, Cxx below illustrates the concept.

Using 50 orthogonal codes C00 through C49, five codes may be transmitted in any order and received to communicate a five digit PIN. Each code is associated with a particular digit of the PIN, with the other digits not represented by that code shown as an "x":

Code List:
C00=xxxx0
C01=xxxx1
C02=xxxx2
C03=xxxx3
C04=xxxx4
C05=xxxx5
C06=xxxx6
C07=xxxx7
C08=xxxx8
C09=xxxx9
C10=xxx0x
C11=xxx1x
C12=xxx2x
C13=xxx3x
C14=xxx4x
C15=xxx5x
C16=xxx6x
C17=xxx7x
C18=xxx8x
C19=xxx9x
C20=xx0xx
C21=xx1xx
C22=xx2xx
C23=xx3xx
C24=xx4xx
C25=xx5xx
C26=xx6xx
C27=xx7xx
C28=xx8xx
C29=xx9xx
C30=x0xxx
C31=x1xxx
C32=x2xxx
C33=x3xxx
C34=x4xxx
C35=x5xxx
C36=x6xxx
C37=x7xxx
C38=x8xxx
C39=x9xxx
C40=0xxxx
C41=1xxxx
C42=2xxxx
C43=3xxxx
C4=4xxxx
C45=5xxxx
C46=6xxxx
C47=7xxxx
C48=8xxxx
C49=9xxxx Note that in the above example, 5 codes will be sent. If each code is transmitted for 40 milliseconds, the PIN will be repeated only after 200 milliseconds. As an example, if the PIN is 58413, the codes that will be sent are C45, C38. C24, C11, and C03, with each code defining a value or character at a particular digit in the sequence of digits. As mentioned before, the order in which the codes are sent does not matter, as each represents a value of a particular digit of the code.

Similarly, since the codes are each on a different frequency, the codes may even be sent simultaneously or in an overlapping manner.

In a further example, the conference identification code or other data may be a sequence of numeric digits such as 22332. The codes that represent this data are also different from each other and may be sent consecutively, at the same time, or otherwise in an overlapping manner such as two codes at a time, or staggered, or other manner. The codes that define this data include C52 for the first digit in the sequence of digits in the data starting from the left, C42, C33, C23, and C12 for the last or fifth digit in the sequence.

Receipt of different frequency signals can be detected and translated into the codes and corresponding PIN or other data using tables that correlate the frequencies and corresponding digits of the PIN or other data. Once the PIN is known, the connection between the service controller device and client device may be established via similar lookup via a local or remote table or service for the appropriate credentials to connect to the room corresponding to the PIN. In further embodiments, the credentials themselves may be transmitted using a similar set of codes.

Figure 6:
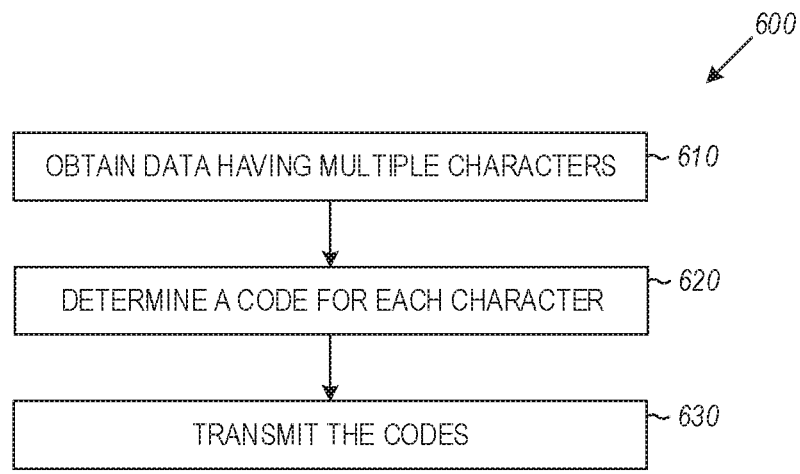
FIG. 6 is a flowchart representation of a method for communicating data utilizing the codes according to an example embodiment.

FIG. 6 is a flowchart representation of a method 600 for communicating data utilizing the codes. Method 600 may start by obtaining data having multiple characters at 610. The data may be stored on local memory or remote memory and may be associated with a room in various embodiments. At 620, a code for each character is determined, wherein each code corresponds to a different audio frequency. The code may be determined by table lookup, or algorithmically by noting a pattern in the codes corresponding to the characters. For instance, the list of codes above may be identified by the first digit indicating the position of the character in the sequence, with the second digit corresponding to the value of the data at that position. Thus, the code "C43" corresponds to the fourth character having a value of three.

The frequency associated with the code may be determined, such as by table lookup, or mathematically using the equations references above by adding 43 steps to the base frequency LowF. The codes are transmitted at the corresponding frequencies at 630.

In one embodiment, the data comprises a conference identification code such as a personal identification number (PIN) corresponding to a conference room. The PIN comprises multiple single digit integers, each integer having a different set of codes identifying a value of the integer. The multiple single digit integers comprise five integers, each having a value between 0 and 9, and wherein the different set of codes for each integer comprise 10 different codes for each integer.

Figure 7:
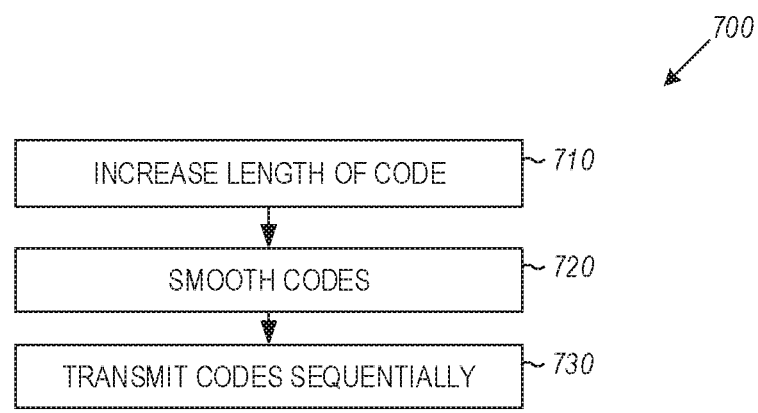
FIG. 7 is a flowchart illustrating a method of transmitting the codes utilizing windowing techniques according to an example embodiment.

FIG. 7 is a flowchart illustrating a method 700 of transmitting the codes utilizing windowing techniques. At 710, a length of each code is increased. Smoothing of the codes is performed at 720. The codes are transmitted sequentially at 730 such that the codes overlap without breaking an orthogonality of the codes and without exceeding a maximum amplitude of a speaker used to transmit the codes.

Longer strings of data than five characters may be sent using a longer list of codes if desired, or the same set of codes may be used to send sets of five characters. Once a first set is known to have been received, such as by an acknowledgement or passage of an agreed upon time, a next set of five characters may be sent using the same codes.

Many different frequency ranges, or even divided frequency ranges may be used for the codes. The hearing range of humans is generally considered to be 20 Hz to 20 kHz. In reality, the highest audible frequency varies from person to person, and decreases with age. In one study conducted by the inventors, with people aged 21-65, very few people heard tones above 17 kHz, and not a single person heard tones above 19.3 kHz. At the same time, many rooms have noise produced by electronic equipment that is often in the vicinity of 20 kHz.

In one embodiment, 40 millisecond long codes were used and were separated by 25 Hz. Thus, to produce 50 codes, a total bandwidth of 50 codes×25 Hz=1250 Hz is sufficient. Many audio devices are capable of operating at a sampling rate of 48 kHz, which can identify signals up to 24 kHz. However, there is often a low pass filter or higher noise at around the upper part of that band.

Thus, while the frequency range is a design parameter that will depend on the number of digits, characters, or symbols in the room identification code or other information to be communicated, one embodiment uses 10 codes with frequencies from 19.5 kHz to 19.75 kHz to transmit a client request, and 50 codes from 20.25 kHz to 21.5 kHz for the room response (i.e., transmitting the conference identification code).

Additionally, the codes used do not have to have subsequent or continuous frequencies. For example, the codes for the conference room can use a small set of frequencies below 20 kHz, skip the region close to 20 kHz, and continue with transmission above that frequency. This avoids using the noisy spectral region around 20 kHz. Still further, human perceptible frequencies may be used in further embodiments. Since the codes need not be transmitted for long periods of time, the use of human perceptible frequencies may not be bothersome to humans in the conference room. To further reduce the perception by humans, lower volumes may also be used in some embodiments provided such codes are adequately received and decodable by devices in the room.

Small differences in clock between the sender and receiver (Clock drift) are often large enough to make the codes undecodable. To alleviate that problem, a pilot frequency/code may be inserted at the start of every transmission. The receiver can use that to estimate the actual sender's clock, and compensate accordingly.

While one method includes sending each code separately (sequentially), the codes can also be sent all at once. This is more in line with traditional OFDM techniques, and, due to the known peak-to-power ratio of OFDM systems, does not exploit the full power capabilities of the PC sound card. However, for cases when amplitude is not a problem, simultaneously transmitting all codes may lead to faster decoding.

Figure 3:
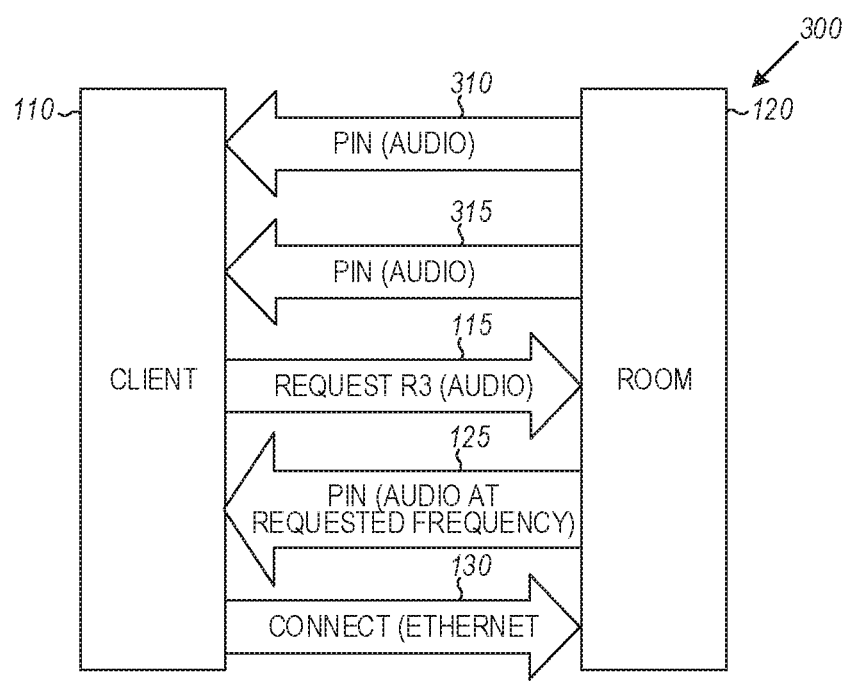
FIG. 3 is a block flow diagram illustrating a further embodiment of communication of information via audio signals between a room and a device according to an example embodiment.

While the room may broadcast the conference identification code in response to a client request, in a further embodiment, the room may continuously broadcast the conference identification code as shown in FIG. 3. In such a case, the need (and associated delay) in having the client first send the request, as well as possible reliability or failure cases where the room does not hear such request is eliminated.

Figure 8:
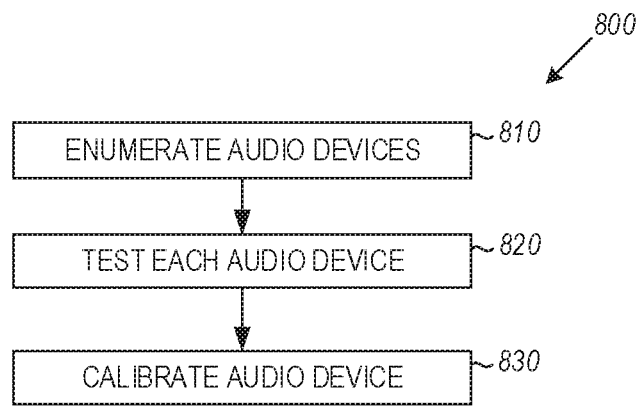
FIG. 8 is a flowchart illustrating a method of self-calibration of audio devices according to an example embodiment.

Client Self-calibration. A related but separate issue is the diversity of clients such as different laptop models, cell phones, tablets, etc., may each have different capabilities, different frequency responses, etc. To alleviate such an issue, a calibration procedure may be used as illustrated in flowchart form at 800 in FIG. 8. At 810, each client enumerates all audio devices (by input and output), and each pair of input and output of the clients is tested for frequency response, noise level, etc., at 820. At 830, the client may calibrate its audio devices such that the codes may be suitably received. The calibration may vary by client device, and may include adjusting a frequency response of each audio device, such as gain at various frequencies to ensure codes are both sent and received at suitable levels.

Note that one output channel and multiple input channels can be tested simultaneously. The client may keep a list of best-performing devices, and use them as appropriate.

In a further embodiment, the room periodically tests its own playback and recording capabilities in accordance with method 800. The room may do that by playing a sound, recording, and analyzing the recorded sound. Such a self-test will give an early warning if there is any problem in one of the devices. The early warning may be used to trigger a self-healing procedure, or to generate an alert or a maintenance request.

Besides the initial client calibration, when the client sends a request, the client may perform a self-test by trying to decode not only the room response, but also the client's own request. If the client cannot hear its own request, this may indicate that either the audio input or output are not working properly. Appropriate action can then be taken (e.g., self-heal, try a different audio device, ask user to type a PIN, etc.).

Noise detection and clean up for Room. The room is continuously listening. As such, it may build a reliable estimation of the room noise, and use that to enhance the decoding process. For example, spectral subtraction, or synchronous noise removal can be used.

Noise removal and clean up for Client. A process similar to the one used in the room could be used in the client. However, clients typically will have much smaller observation time. To improve that decoding, the noise estimation can be augmented with information provided by the room to a server.

Figure 9:
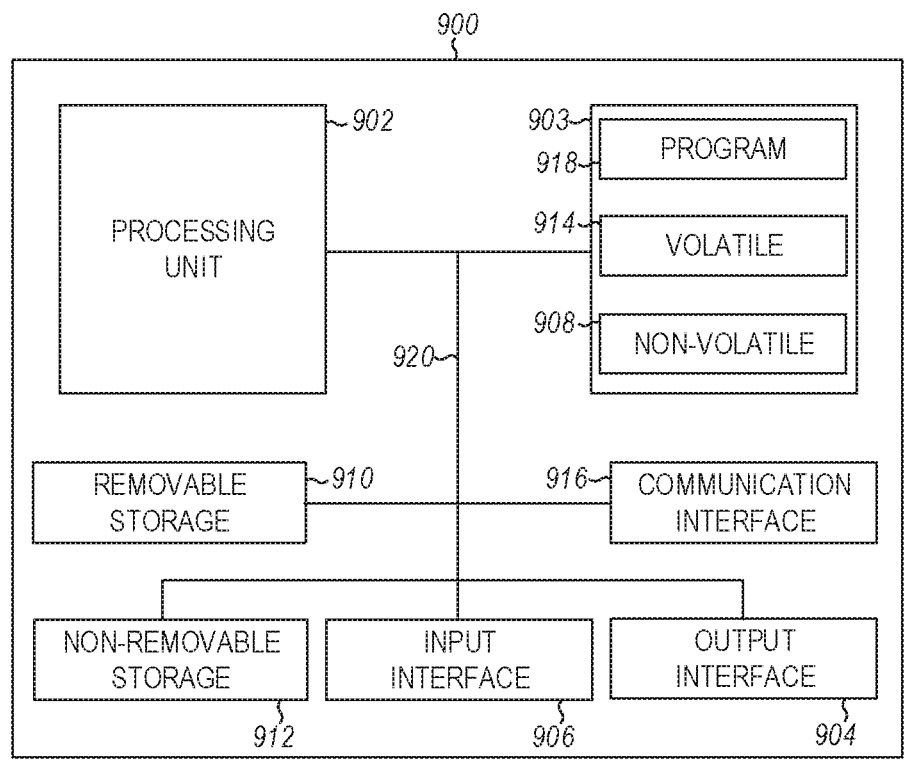
FIG. 9 is a block diagram of circuitry for example devices to perform methods and algorithms according to example embodiments.

FIG. 9 is a block schematic diagram of a computer system 900 to implement client devices, service controller devices, web servers and other devices for performing methods and algorithms according to example embodiments. All components need not be used in various embodiments.

One example computing device in the form of a computer 900 may include a processing unit 902, memory 903, removable storage 910, and non-removable storage 912. Although the example computing device is illustrated and described as computer 900, the computing device may be in different forms in different embodiments. For example, the computing device may instead be a smartphone, a tablet, smartwatch, or other computing device including the same or similar elements as illustrated and described with regard to FIG. 9. Devices, such as smartphones, tablets, and smartwatches, are generally collectively referred to as mobile devices or user equipment. Further, although the various data storage elements are illustrated as part of the computer 900, the storage may also or alternatively include cloud-based storage accessible via a network, such as the Internet or server based storage.

Memory 903 may include volatile memory 914 and non-volatile memory 908. Computer 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 900 may include or have access to a computing environment that includes input interface 906, output interface 904, and a communication interface 916. Output interface 904 may include a display device, such as a touchscreen, that also may serve as an input device. The input interface 906 may include one or more of a touchscreen, touchpad, mouse, keyboard, camera, one or more device-specific buttons, one or more sensors integrated within or coupled via wired or wireless data connections to the computer 900, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 900 are connected with a system bus 920.

Computer-readable instructions stored on a computer-readable medium are executable by the processing unit 902 of the computer 900, such as a program 918. The program 918 in some embodiments comprises software that, when executed by the processing unit 902, performs network switch operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 918 may be used to cause processing unit 902 to perform one or more methods or algorithms described herein.

EXAMPLES

1. A method includes obtaining data representing multiple characters, determining a code for each character wherein each code corresponds to a different audio frequency, and transmitting the codes at the corresponding audio frequencies.

2. The method of example 1 wherein the data comprises a conference identification code, and wherein the conference identification code indicates a personal identification number (PIN) corresponding to a conference room.

3. The method of example 2 wherein the PIN comprises multiple single digit integers, each integer having a different set of codes identifying a value of the integer.

4. The method of example 3 wherein the multiple single digit integers comprise five integers, each having a value between 0 and 9, and wherein the different set of codes for each integer comprise 10 different codes for each integer.

5. The method of any of examples 1-4 wherein transmitting the codes includes increasing a length of each code, smoothing the codes such that the codes overlap without breaking an orthogonality of the codes and without exceeding a maximum amplitude, and transmitting the codes sequentially via a speaker used to transmit the codes.

6. The method of any of examples 1-5 wherein an order in which the codes are transmitted is variable without changing the data.

7. The method of any of examples 1-6 and further comprising receiving an audio signal representing a request for the data, and wherein transmitting the codes is performed responsive to receiving the request for the data.

8. The method of example 7 wherein the request for data comprises codes selected from a set of code different from the codes for the data.

9. The method of any of examples 1-8 and further comprising transmitting the codes periodically.

10. The method of any of examples 1-9 wherein the different audio frequencies are equally spaced in a range of frequencies.

11. The method of any of examples 1-10 wherein the different audio frequencies are above 19 KHz.

12. The method of any of examples 1-11 and further comprising transmitting an audio pilot signal prior to transmission of the codes to synchronize clocks between a transmitter of the codes and a receiver of the codes.

13. The method of any of examples 1-12 wherein the codes are orthogonal frequency division multiplexing (OFDM) codes.

14. A machine readable storage device has instructions for execution by a processor of the machine to cause the processor to perform operations. The operations include obtaining data having multiple characters, determining a code for each character wherein each code corresponds to a different audio frequency, and transmitting the codes at the corresponding audio frequencies.

15. The storage device of example 14 wherein the data comprises a sequence of characters, each character in the sequence corresponding to a different set of codes identifying the character at the character's position in the sequence.

16. The storage device of any of examples 14-15 wherein transmitting the codes includes increasing a length of each code, smoothing the codes, and transmitting the codes sequentially such that the codes overlap without breaking an orthogonality of the codes and without exceeding a maximum amplitude of a speaker used to transmit the codes.

17. The storage device of any of examples 14-16 wherein an order in which the codes are transmitted is variable without changing the data.

18. A device includes a processor and a memory device coupled to the processor and having a program stored thereon for execution by the processor to perform operations. The operations include obtaining data having multiple characters, determining a code for each character wherein each code corresponds to a different audio frequency, and transmitting the codes at the corresponding frequencies.

19. The device of example 18 wherein the data comprises a sequence of characters, each character in the sequence corresponding to a different set of codes identifying the character at the character's position in the sequence.

20. The device of any of examples 18-19 wherein transmitting the codes includes increasing a length of each code, smoothing the codes, and transmitting the codes sequentially via a speaker such that the codes overlap without breaking an orthogonality of the codes and without exceeding a maximum amplitude of the speaker used to transmit the codes.

21. A system includes processing circuitry and communications circuitry. The processing circuitry is adapted to obtain data for a conference identification code of a conference communication session, and determine a code for each character wherein each code corresponds to a different audio frequency, with the conference identification code including multiple characters. The communications circuitry is adapted to transmit the codes at the corresponding audio frequencies, and establish a connection with a remote device in the conference communication session, in response to use of the conference identification code by the remote device.

22. The system of example 21 wherein the conference identification code indicates alphanumeric characters unique to a conference room or unique to the conference communication session.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
obtaining data representing an ordered sequence of multiple characters;
determining a code for each character in the ordered sequence of multiple characters, wherein each character in the ordered sequence of multiple characters corresponds to a different code identifying the character and sequence position of the character in the ordered sequence of multiple characters;
identifying a set of audio frequencies for the ordered sequence of multiple characters, wherein each determined code corresponds to a different audio frequency and wherein each audio frequency uniquely indicates a combination of a respective character and a respective sequence position of the respective character; and
transmitting the set of audio frequencies to a receiver, wherein each respective audio frequency of the set of audio frequencies is used by the receiver to reconstruct the ordered sequence of multiple characters independent of a sequence of the transmitting of the set of audio frequencies.

2. The method of claim 1 wherein the data comprises a conference identification code, and wherein the conference identification code indicates a personal identification number (PIN) corresponding to a conference room.

3. The method of claim 2 wherein the PIN comprises multiple single digit integers, each integer having a different set of codes identifying a value of the integer.

4. The method of claim 3 wherein the multiple single digit integers comprise five integers, each having a value between 0 and 9, and wherein the different set of codes for each integer comprise 10 different codes for each integer.

5. The method of claim 1 wherein transmitting the codes comprises:
increasing a length of each code;
smoothing the codes such that the codes overlap without breaking an orthogonality of the codes and without exceeding a maximum amplitude; and
transmitting the codes sequentially via a speaker used to transmit the codes.

6. The method of claim 1 wherein an order in which the codes are transmitted is variable without changing the data.

7. The method of claim 1 and further comprising receiving an audio signal representing a request for the data, and wherein transmitting the codes is performed responsive to receiving the request for the data.

8. The method of claim 7 wherein the request for data comprises codes selected from a set of code different from the codes for the data.

9. The method of claim 1 and further comprising transmitting the codes periodically.

10. The method of claim 1 wherein the different audio frequencies are equally spaced in a range of frequencies.

11. The method of claim 1 wherein the different audio frequencies are above 19 KHz.

12. The method of claim 1 and further comprising transmitting an audio pilot signal prior to transmission of the codes to synchronize clocks between a transmitter of the codes and a receiver of the codes.

13. The method of claim 1 wherein the codes are orthogonal frequency division multiplexing (OFDM) codes.

14. A machine readable storage device having instructions for execution by a processor of the machine to cause the processor to perform operations comprising:
obtaining data representing an ordered sequence of multiple characters;
determining a code for each character in the ordered sequence of multiple characters, wherein each character in the ordered sequence of multiple characters corresponds to a different code identifying the character and sequence position of the character in the ordered sequence of multiple characters;
identifying a set of audio frequencies for the ordered sequence of multiple characters, wherein each determined code corresponds to a different audio frequency and wherein each audio frequency uniquely indicates a combination of a respective character and a respective sequence position of the respective character; and
transmitting the set of audio frequencies to a receiver, wherein each respective audio frequency of the set of audio frequencies is used by the receiver to reconstruct the ordered sequence of multiple characters independent of a sequence of the transmitting of the set of audio frequencies.

15. The storage device of claim 14 wherein the data comprises a sequence of characters of a conference identification code, each character in the sequence corresponding to a different set of codes identifying the character at the character's position in the sequence.

16. The storage device of claim 14 wherein transmitting the codes comprises:
increasing a length of each code;
smoothing the codes; and
transmitting the codes sequentially such that the codes overlap without breaking an orthogonality of the codes and without exceeding a maximum amplitude of a speaker used to transmit the codes.

17. The storage device of claim 14 wherein an order in which the codes are transmitted is variable without changing the data.

18. A device comprising:
a processor; and
a memory device coupled to the processor and having a program stored thereon for execution by the processor to perform operations comprising:
obtaining data representing an ordered sequence of multiple characters;
determining a code for each character in the ordered sequence of multiple characters, wherein each character in the ordered sequence of multiple characters corresponds to a different code identifying the character and sequence position of the character in the sequence of multiple characters;
identifying a set of audio frequencies for the ordered sequence of multiple characters, wherein each determined code corresponds to a different audio frequency and wherein each audio frequency uniquely indicates a combination of a respective character and a respective sequence position of the respective character; and transmitting the set of audio frequencies to a receiver, wherein each respective audio frequency of the set of audio frequencies is used by the receiver to reconstruct the ordered sequence of multiple characters independent of a sequence of the transmitting of the set of audio frequencies.

19. The device of claim 18 wherein the data comprises a sequence of characters of a conference identification code, each character in the sequence corresponding to a different set of codes identifying the character at the character's position in the sequence.

20. The device of claim 18 wherein transmitting the codes comprises:
increasing a length of each code;
smoothing the codes; and
transmitting the codes sequentially via a speaker such that the codes overlap without breaking an orthogonality of the codes and without exceeding a maximum amplitude of the speaker used to transmit the codes.

21. A system comprising:
processing circuitry adapted to:
obtain data for a conference identification code of a conference communication session, the conference identification code including an ordered sequence of multiple characters; and
determine a code for each character in the ordered sequence of multiple characters, wherein each character in the ordered sequence of multiple characters corresponds to a different code identifying the character and sequence position of the character in the ordered sequence of multiple characters;
identify a set of audio frequencies for the ordered sequence of multiple characters, wherein each determined code corresponds to a different audio frequency and wherein each audio frequency uniquely indicates a combination of a respective character and a respective sequence position of the respective character;
communications circuitry adapted to:
transmit the set of audio frequencies to a receiver, wherein each respective audio frequency of the set of audio frequencies is used by the receiver to reconstruct the ordered sequence of multiple characters independent of a sequence of the transmitting of the set of audio frequencies; and
establish a connection with a remote device in the conference communication session, in response to use of the conference identification code by the remote device.

22. The system of claim 21 wherein the conference identification code indicates alphanumeric characters unique to a conference room or unique to the conference communication session.

* * * * *